United States Patent [19]

Burkarth

[11] Patent Number: 4,499,815
[45] Date of Patent: * Feb. 19, 1985

[54] AIR DIFFUSER

[75] Inventor: Jack L. Burkarth, Dallas, Tex.

[73] Assignee: Gulton Industries, Inc., Plano, Tex.

[*] Notice: The portion of the term of this patent subsequent to Oct. 5, 1999 has been disclaimed.

[21] Appl. No.: 394,259

[22] Filed: Jul. 1, 1982

Related U.S. Application Data

[63] Continuation of Ser. No. 175,639, Aug. 6, 1980, Pat. No. 4,352,323, which is a continuation of Ser. No. 934,907, Aug. 18, 1978, abandoned.

[51] Int. Cl.³ ............................................. F24F 13/06
[52] U.S. Cl. ..................... 98/40.14; 98/41.3
[58] Field of Search ................. 98/40 C, 40 D, 40 R, 98/41 R, 41 SV, 2.14, 2.15, 40 E, 8, 10

[56] References Cited

U.S. PATENT DOCUMENTS

| | | | |
|---|---|---|---|
| 3,223,019 | 12/1965 | Schuh | 98/41 SV |
| 3,383,999 | 5/1968 | Fragnito et al. | 98/40 D |
| 3,554,112 | 1/1971 | Herb | 98/40 D |
| 3,665,837 | 5/1972 | Balfanz, Jr. | 98/40 D |
| 3,757,666 | 9/1973 | Lambert | 98/40 D |
| 3,831,506 | 8/1974 | Landheer | 98/41 SV |
| 3,961,748 | 6/1976 | McNabney | 98/40 D |
| 3,967,780 | 7/1976 | Traver | 98/40 D |
| 4,034,659 | 7/1977 | Raider | 98/40 D |
| 4,062,273 | 12/1977 | O'Connor | 98/8 |

FOREIGN PATENT DOCUMENTS 2608053 9/1977 Fed. Rep. of Germany ... 98/41 SV

Primary Examiner—Henry C. Yuen
Attorney, Agent, or Firm—Darby & Darby

[57] ABSTRACT

A linear air diffuser is disclosed for the delivery of conditioned air to the interior of a passenger vehicle such as a bus, railcar or the like. The diffuser consists of a frame structure characterized by a pair of open ended longitudinally extending delivery channels situated in a generally parallel side-by-side relationship. Each of the channels is turned to extend laterally outwardly in opposite directions and is provided with a curved interior surface on one wall to intercept input air so as to induce eddy currrent turbulence in the flow characteristics of the delivered air. The input openings to the channels are partially closed by a common longitudinal plate releasably affixed to the frame structure. The lateral peripheral edges of the plate serve to determine the width of a narrow longitudinal input orifice for each of the channels.

5 Claims, 4 Drawing Figures

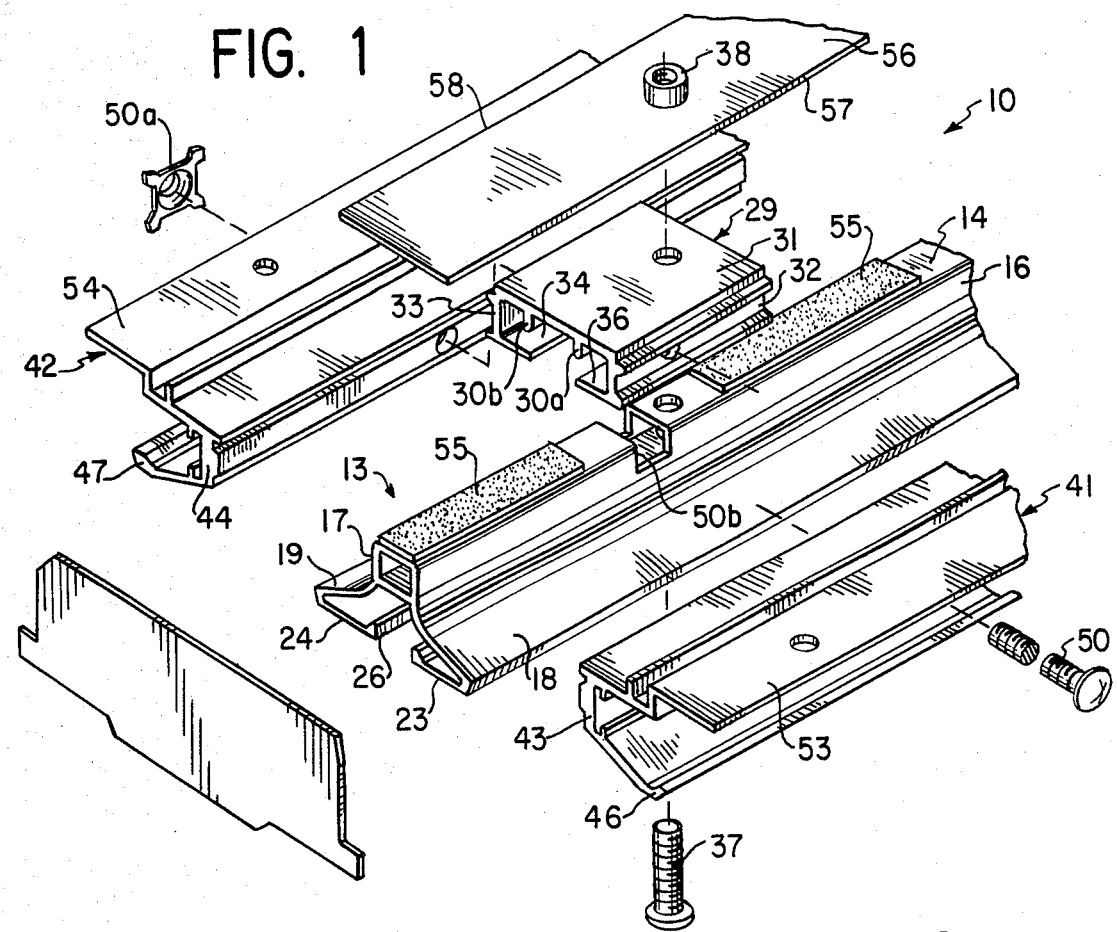

AIR DIFFUSER

This is a continuation of application Ser. No. 175,639, filed Aug. 6, 1980 issued Oct. 5, 1982 as U.S. Pat. No. 4,352,323, which is a continuation of application Ser. No. 934,907, filed Aug. 18, 1978, now abandoned.

BACKGROUND OF THE INVENTION

Air-conditioning systems for public transportation vehicles pose special design problems and challenges. Such a system must be capable of offsetting to an established degree the relatively high heat load expected to be generated by the maximum density of passengers for which the vehicle is designed. Conditioned air must therefore be delivered to the passenger cabin at a relatively high cooling rate. For example, with respect to a railcar of approximately 5400 cubic feet, typical cooling specifications require conditioned air to be delivered at the rate of about 3600 cubic feet per minute (C.F.M) which is equal to a complete air change within the vehicle every 1.5 minutes (approximately five times the rate of a normal residential cooling system).

At such delivery rates, significant problems occur with respect passenger comfort. Precise control over the direction of air flow within the vehicle cabin, and in particular with respect to the air flow in the vicinity of the diffuser outlet must be exercised. Since circulating velocities within the vehicle must be relatively high, impingement of the circulating air upon the passengers (particularly those located in proximity to the diffuser outlet) must be avoided in order to preserve their comfort.

Heretofore, vehicle air-conditioning systems have employed a plurality of interconnected air-diffusing outlets distributed throughout the vehicle passenger cabin at predetermined locations. Unfortunately, such prior arrangements have been found to result in undesirable drafts on passengers situated in the vicinity of the outlets, particularly with respect to standing passengers.

One technique which has been utilized heretofore for lowering the velocities at which conditioned air exits from the diffusing outlet (without affecting the cooling rate) is to provide a linear diffuser element which extends continuously along the full length of the vehicle from one end to the other. It is well understood that such a diffuser delivers air at exit velocities which (for a given cooling rate) are less than those which would be present at each of a group of dispersed diffuser outlets as described above.

However, even the use of linear air diffusers has generally failed heretofore to satisfy several basic requirements for adequate passenger comfort. These requirements are essentially as follows:

(1) the rate at which the linear diffuser delivers conditioned air to the vehicle cabin must be substantially uniform throughout the length of the diffuser;

(2) the direction in which conditioned air exits from the diffuser outlets must be carefully controlled to avoid its being dumped onto the passengers; and (3) conditioned air delivered by the air-conditioning system must be adapted to mix thoroughly with ambient air of a different temperature within the vehicle.

An air conditioning system for public vehicles which satisfies all of these basic requirements has not been available heretofore. While it has been possible to achieve generally uniform delivery rates, none of the prior systems has been able to avoid to any significant extent, impingement of the conditioned air directly upon the passengers, particularly the standing passengers and those located proximate to the air delivery outlets.

These and other disadvantages of the prior types of air diffusers are obviated by the present invention in which the diffuser or air delivery nozzle is adapted to effect selected turbulence characteristics in the delivered air such that it tends principally to flow laterally outwardly along the ceiling plane of the vehicle toward the side walls of the cabin. The delivered air is thereafter turned downward by the cabin walls and circulates generally along the cabin periphery. The ambient air within the cabin is drawn into the circulating temperature-controlled air and is mixed therewith to effect comprehensive cooling of the cabin. The stream of conditioned air creates a shear effect as it passes over the inner surfaces of the vehicle ceiling and walls thereby to generate an additional degree of turbulence which facilitates the mixing.

In accordance with the invention, the output nozzle of the present diffuser is adapted to generate a cyclical or whirling turbulence within the delivered air flow. Such eddy current turbulence not only assists in mixing the ambient and delivered air, but causes the delivered air to hang near the ceiling as it moves outwardly toward the cabin walls rather than to drop onto nearby passengers. As a result, efficient cooling of the cabin is achieved without generating uncomfortable drafts on the passengers.

These and other objectives of the present invention are obtained by providing a linear air diffuser which extends longitudinally along the length of the passenger vehicle at its ceiling. In one embodiment of the invention, the diffuser nozzle includes a pair of outwardly diverging longitudinal output channels defined in part by the sidewalls of a central rail or vane of generally Y-shaped cross-sectional configuration. The sidewalls are shaped into a pair of back-to-back generally concave external surfaces each of which forms one interior wall of each of the output channels. A pair of substantially U-shaped longitudinal side rail members coextensive with the central rail are connected to opposite sides thereof in spaced relation to the concave surfaces and open laterally outwardly in opposite directions. The inwardly facing continuous surface areas of the base section and laterally extending lower flange of each of the side rails forms the other interior wall of each of the output channels. Each of the lower flanges may be provided with a generally planar section which is parallel to and overlies for a predetermined distance the opposite interior wall of the channel near the output opening. Air entering the two channels at their inner ends is deflected to flow laterally outwardly away from the diffusor in substantially opposite directions.

Entrance of pressurized air to the two channels at their respective inner ends is controlled by each of a pair of generally parallel orifice slots or openings which extend longitudinally along the length of the diffuser. In one embodiment, the orifice openings are defined on one side by the longitudinal peripheral edges of a substantially flat orifice plate centered at the top of the central rail and coextensive therewith. The other side of each of the orifice openings is determined by an opposing peripheral edge formed along each of the side rails.

In accordance with the invention, the size of the orifice openings may be fixed, by adjusting the plate width in relationship to the static pressure of conditioned air available within the system upstream of the output nozzle. In this way, a desired delivery rate for the diffuser (determined by the orifice opening) may be achieved for a given air supply pressure, such that the delivery rate remains consistent throughout the vehicle length.

BRIEF DESCRIPTION OF THE DRAWINGS

For a further understanding of the present invention, reference may be had to the accompanying drawings in which:

FIG. 1 is an exploded view of an air diffuser in accordance with the invention;

FIG. 2 is a perspective view of the air diffuser of FIG. 1.

BRIEF DESCRIPTION OF THE PREFERRED EMBODIMENTS

Figure 4:
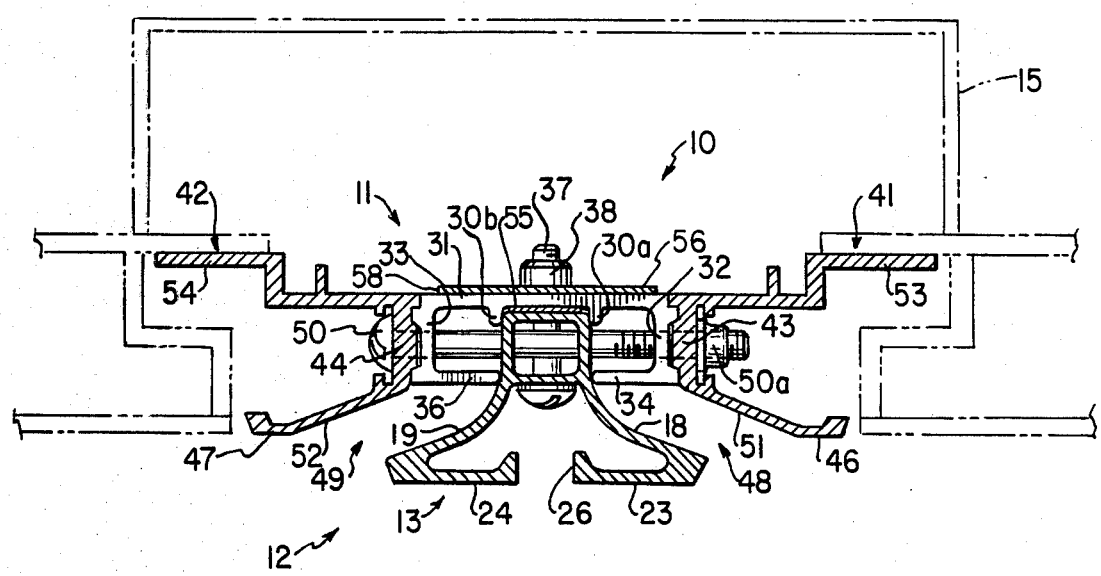
FIG. 4 is a cross-section taken along the line 4—4 of FIG. 3.

Referring now to the drawings, and in particular to FIGS. 1 and 4, there is illustrated a linear air diffuser assembly generally indicated by reference numeral 10, having an input side 11 and an output side 12. The diffuser is designed to interface with an air supply plenum or duct 15 usually situated above the ceiling of a passenger vehicle such as a railcar or bus, and generally extending along the entire length of the vehicle. A typical duct system of the average railcar for example, may extend for a length of approximately 50 feet or more along the top of the vehicle. Conditioned air is supplied to the duct under pressure and enters the diffuser through its input side 11. The output side 12 faces downwardly into the vehicle passenger cabin and, in accordance with the present invention, is adapted to distribute the conditioned air in a particular flow pattern, described below, along the length of the cabin.

In the present embodiment, the diffuser 10 is characterized by an elongated central rail or vane 13 which is preferably formed of aluminum by an extrusion process in modular section lengths as established by the total length of the supply duct system servicing the passenger cabin. The rail 13 is provided with a flat longitudinal upper surface 14 which is joined along its opposite longitudinal edges by a pair of generally downwardly directed side walls 16 and 17. The sidewall 16 and 17 are substantially straight in the vicinity of the upper surface 14, but gradually blend into laterally outwardly diverging curvilinear sections 18 and 19 respectively, which flare apart for approximately equal distances from the center of the rail. The radius of curvature for each of the sections 18 and 19 is substantially the same, and the walls gradually straighten out as they approach their respective lateral edges. The side walls 16 and 17 may also be turned or bent inwardly below their curved outer surfaces to define a pair of opposing generally straight horizontal sections 23 and 24 which face the interior of the passenger cabin. The sections 23 and 24 terminate in spaced apart relation to define a central longitudinal gap or slot 26. The rail 13 is preferably hollow to conserve weight.

In the present embodiment, the rail 13 is fitted with a plurality of overlying transverse spacers 29 which are centered on the upper surface 14 and which extend equally in opposite directions laterally outwardly therefrom. Each of the spacers is provided with a flat upper surface 31 and a pair of depending substantially parallel mounting walls 32 and 33 which overlie the innermost generally upright portions of the sidewalls 16 and 17 respectively. The spacers 29 are preferably hollow to conserve weight, and in that case may be provided with interior locating ribs 30a and 30b which straddle the upper surface 14 of the rail 13 to ensure reliable positioning of the center of the spacer at the top of the central rail. Under these conditions, the spacers 29 may also be provided with lower inwardly directed flanges 34 and 36 to abut against the sidewalls 16 and 17 for additional stability.

Each of the spacers may be secured to the rail 13 by means of a threaded bolt 37 which extends upwardly through the rail and spacer to be engaged externally by a cooperating nut 38. Access to the head of the bolt 37 for assembly purposes is provided through the longitudinal slot 26.

Identical generally U-shaped side rails 41 and 42 are affixed on opposite sides of the central rail 13 to the spacers 29. The arrangement is such that the side rails, which are coextensive with the central rail, open laterally outwardly in opposite directions. Each of the side rails is provided with a relatively straight internal base section 43 and 44, respectively, which abuts against and is secured to a corresponding one of the depending mounting walls 32 and 33 of each of the spacers 29. The mounting walls are preferably provided with external notches 45a and 45b to receive corresponding locating lugs on the base sections of the side rails. This arrangement insures accurate spacing of each portion of the side rail geometry with respect to the central rail 13. The side rails may be secured to the spacers by a single transverse bolt 50 and fastener 50a. The bolt may pass through the assembly laterally from either direction, and a clearance notch 50b may be provided in the central rail to receive the bolt and also allow removal of the rail 13 for servicing or adjustment of air flow, if required, without disturbing the remainder of the assembly.

Lower legs or flanges 46 and 47, respectively, of the side rails 41 and 42 extend obliquely outwardly from their respecive base sections in diverging directions which correspond substantially to the directions assumed by the underlying sidewalls 16 and 17 of the central rail 13. The spacing between the sidewalls 16 and 17 of the central rail 13 and the overlying side rails 41 and 42 remains substantially constant along the length of the sidewalls 16 and 17 thereby to define identical air diffusion channels 48 and 49 therebetween on opposite sides of the central rail. The effective length of the channels 48 and 49 and consequently the output flow characteristics of the diffuser are affected by the lateral extent and direction of the flanges 46 and 47.

In the present embodiment, the flanges 46 and 47 are each characterized by a substantially flat inwardly facing surface area 51 and 52, respectively. Each of the areas 51 and 52 substantially parallels the opposing relatively straight lower segment of respective sidewalls 16 and 17 and extends outwardly thereof so as to define the output openings for the diffusion channels and to control the air delivery velocity and other flow characteristics of air exiting from the diffuser.

It will be understood that the invention is not to be limited to any particular geometry for the deflective flanges 46 and 47 and that the length of the diffusion channels between their input and output openings may be empirically determined in advance to satisfy the known specifications for each particular air conditioning system.

Upper legs 53 and 54 of the side rails 41 and 42, respectively, are generally utilized for mounting the diffuser assembly adjacent the air plenum 15 in the ceiling of the passenger vehicle. Accordingly, their configuration may likewise be varied to take into account the mounting requirements for any particular installation.

Figure 3:
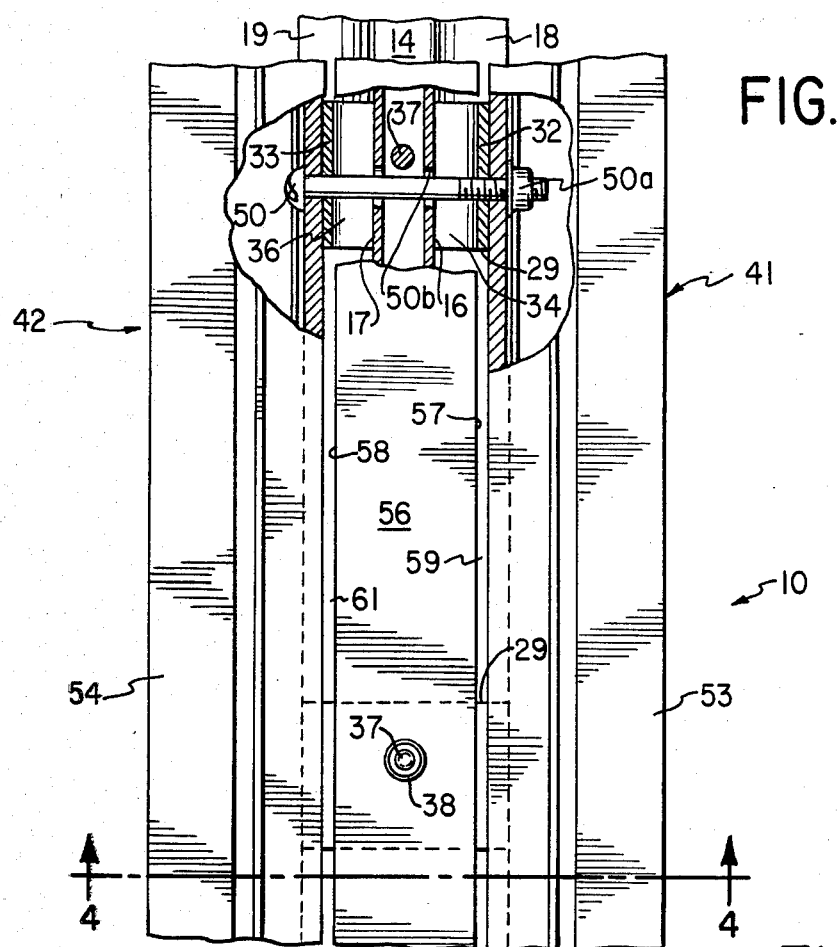
FIG. 3 is a top plan view of the air diffuser of FIG. 1.

With reference to FIGS. 2 and 3, an elongated substantially planar orifice plate 56 is situated adjacent the top of the central rail 13 to overlie to a predetermind extent the input and of each of the diffusion channels 48 and 49. Alternatively, a pair of similar plates might be utilized such that one overlies each of the diffusion channels. The orifice openings might be adjusted by sliding the plates laterally back and forth over the import openings to the channels. One plate might be skewed relative to the other to taper the orifice opening, as desired.

The plate 56 is substantially coextensive with the rail 13 and rests along the upper surfaces 31 of each of the several spacers 29. Where desired, a cork layer 55 may be provided between the orifice plate and the central rail to insure uniform support beneath the plate along the length of the diffuser unit. The plate is releasably secured in position by the bolts 37 and cooperating nuts 38.

The width of the orifice plate 56 is such that its lateral peripheral edges 57 and 58 are spaced a predetermined distance from adjacent peripheral edges of the corresponding side rail base sections 43 and 44. This spacing defines a pair of longitudinal input orifices 59 and 61 which may be of equal or unequal areas, one for each of the diffusion channels 48 and 49 to control the rate at which conditioned air enters the diffusion channels for distribution into the vehicle cabin. In the preferred embodiment, the input orifices 59 and 61 extend continuously along the entire length of the diffuser element 10 in parallel relationship, although each may also consist of a colinear series of discrete longitudinal slots if necessary.

The dimensions of the input orifices are determined in advance of installation of the diffuser in accordance with the known characteristics of the air supply fan source (not shown) and distribution duct or plenum geometry for the air conditioning system for which the diffuser is being tailored. The orifice size is chosen (by adjusting the size of the orifice plate 56) so as to enable the diffuser to deliver conditioned air consistently along its length at the desired or specified C.F.M. delivery rate. In general, the orifice size is selected by matching as closely as possible with the specified output rate to be achieved by the system, empirically derived output rates for several proposed orifice openings (with respect to a given section of diffuser).

In addition with respect to human comfort systems, it has been found experimentally that for a given orifice opening, the output delivery rate of the diffuser in C.F.M. per foot length of diffuser varies linearly with the static pressure of conditioned air within the supply duct. A family of related calibration curves for particular orifice openings may thus be generated for appropriate reference in confirming adequate system performance. Thus, air delivery rates (C.F.M.) in any given longitudinal location may be accurately established by a single measurement of static pressure at the subject location. This value provides a more precise verification of diffuser output due to its magnitude and stability.

This technique avoids the measurement to exit air velocities, heretofore required, which are normally quite variable and indeterminate.

In general, the longitudinal orifices 59 and 61 open into the fixed air plenum or supply duct 15 situated above the diffuser element and into which conditioned air is forced from one end by a suitable fan or the like (not shown). It has been found that the geometry of this supply duct plays a significant role in the ultimate C.F.M. delivery rate of the diffuser element. Accordingly, it is desirable to correlate the shape of the orifice opening to the geometry of the supply duct with which the diffuser is tailored to interface. For example, if, as is common, the supply duct is tapered so as gradually to constrict its volume at the end opposite the air supply fan, it has been found that the orifice openings may remain substantially uniform along the length of the diffuser to insure a constant flow rate through the diffusion channels. The tapered geometry of the supply duct insures a relatively constant internal air supply pressure along the length of the duct despite the gradual air supply depletion as air passes through the diffuser into the vehicle cabin.

On the other hand, where the geometry of the air supply duct is such that its volume remains substantially uniform along its length, it is preferable to taper the orifice openings such that they are narrow at the input end of the duct and gradually enlarge by a predetermined amount as they approach the opposite end. Thus, the tapered orifice opening compensates for the variation in air supply pressure along the length of the uniform duct to provide a consistent delivery rate at all points along the diffuser.

In operation, pressurized conditioned air from the air supply duct enters the diffuser through input orifices 59 and 61. In accordance with known physical principles, the velocity of the air increases as it passes through the orifice constrictions and the air expands within the diffusion channels 48 and 49 to impinge upon the curvilinear inner side walls 16 and 17 of the central rail 13. Considering the diffusion channel 48, for example, it will be seen that the air flow velocity adjacent the curved section of the interior channel wall is greater than the flow velocity at other points within the channel. This phenomenon serves to generate a vortex or eddy current turbulence within the channel such that the air begins to circulate or whirl in a counterclockwise direction as it moves toward the outlet of the channel. Such turbulence in the air exiting from the channel causes it to tend to hug the adjacent ceiling of the vehicle as it expands laterally outwardly along the ceiling plane toward the vehicle walls. A similar effect is achieved as a result of corresponding turbulence generated within the diffusion channel 49. Downward flow components in the delivered air are therefore reduced so that the air remains near the ceiling and avoids impingement upon passengers seated beneath or standing near the diffusion outlet. Moreover, the swirling turbulence effects adequate mixing of the conditiond air and the ambient air within the vehicle to provide the requisite cooling rate.

Various changes and modifications will occur to those skilled in the art. For example, the present invention need not be limited to the multi-section diffuser assembly described above. One or more elements of the diffuser may be formed together as a single common piece or in the form of sub-assemblies, with orifice openings then being sawed, milled or routed as neces-

What is claimed is:

1. A linear air diffuser for distributing a volume of air under pressure in a uniform output flow of controlled velocity and direction comprising:

a frame structure having a longitudinal air carrying channel with an upper air inlet having at least one longitudinally directed orifice and a lower air outlet;

means for controlling the flow of air into said channel through said upper inlet to be substantially constant along the length of said channel;

said frame structure comprising:

a side rail, extending longitudinally parallel to and defining one side of said channel, said rail having a side wall directed downwardly from said upper inlet and a lower flange beginning at the lower end of the side wall and extending laterally outwardly from said upper inlet to define the upper side of said outlet, and a deflector vane, extending longitudinally parallel to and defining another side of said channel, said vane having a curved air turning surface which includes a downwardly directed portion merging into a lower section defining the lower side of said outlet, said section extending laterally outwardly beyond and below the beginning of the flange of the side rail to overlap at least a portion of the flange so as to define with the flange said lower outlet, said curved air turning surface situated to intercept air entering said channel from said upper inlet such that the velocity of air flow adjacent to said curved surface is greater than the velocity of the air flowing adjacent to at least a porton of said side rail, thereby inducing upwardly directed eddy current in the output flow pattern generated by said channel, for delivery from the diffuser in a substantially lateral direction.

2. The diffuser of claim 1 in which the lower section and lower flange of said deflector vane and side rail respectively are substantially straight and parallel.

3. The diffuser of claim 1, wherein said means for controlling the flow of air comprises orifice-defining means having an opening whose size varies linearly with respect to longitudinal distance from a specified point on said frame structure.

4. The diffuser of claim 3 in which the frame structure defines a pair of said longitudinal air carrying channels, each of the channels having an upper inlet and a lower portion which extends obliquely to the plane of its upper inlet whereby said channels diverge laterally outwardly relative to the frame in substantially opposite directions.

5. A linear air diffuser for distributing a volume of air under pressure in a uniform output flow of controlled velocity and direction comprising:

a frame structure defining at least a pair of longitudinal air carrying channels with respective upper air inlets and lower air outlets, said upper inlets each having at least one orifice arranged substantially linearly along the length of said channels, each of said channels having a lower portion which extends obliquely to the plane of its respective inlet orifice so that said channels diverge laterally outwardly relative to the frame in substantially opposite directions, said frame structure comprising:

side rails, extending longitudinally parallel to and defining one side of respective ones of said channels, each of said rails having a side wall directed downwardly from said upper inlet and a lower flange beginning at the lower end of the side wall and extending laterally outwardly from said upper inlet to define the upper side of said outlet, and a deflector vane, extending longitudinally parallel to and defining the other sides of said channels, said vane having at least a pair of curved air turning surfaces, each of which includes a downwardly directed portion merging into a laterally outwardly directed lower section defining the lower side of one of said outlets, each of said sections extending laterally outwardly beyond and below the beginning of a respective flange of one of the side rails to overlap at least a portion of the flange so as to define with said flanges one of said lower air outlets, said curved air turning surfaces situated to intercept air entering their respective channels from said upper inlets such that the velocity of air flow adjacent to each said curved surface is greater than the velocity of the air flowing adjacent to at least a portion of its corresponding side rail, thereby inducing upwardly directed eddy current in the output flow patterns generated by said channels, for delivery from the diffuser in substantially opposite and lateral directions.

* * * * *